(12) United States Patent
Cantrell et al.

(10) Patent No.: US 7,845,215 B2
(45) Date of Patent: Dec. 7, 2010

(54) RESONANT DIFFERENCE-FREQUENCY ATOMIC FORCE ULTRASONIC MICROSCOPE

(75) Inventors: John H. Cantrell, Williamsburg, VA (US); Sean A. Cantrell, Williamsburg, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 529 days.

(21) Appl. No.: 11/844,571

(22) Filed: Aug. 24, 2007

(65) Prior Publication Data

US 2008/0295584 A1 Dec. 4, 2008

Related U.S. Application Data

(60) Provisional application No. 60/940,980, filed on May 31, 2007.

(51) Int. Cl.
*G01B 5/28* (2006.01)
(52) U.S. Cl. ....................................... 73/105
(58) Field of Classification Search ............... 73/105
See application file for complete search history.

(56) References Cited

U.S. PATENT DOCUMENTS

| | | | |
|---|---|---|---|
| 5,319,977 A | 6/1994 | Quate et al. | |
| 5,412,980 A | 5/1995 | Elings et al. | |
| 5,436,448 A | 7/1995 | Hosaka et al. | |
| 5,625,142 A | 4/1997 | Gamble | |
| 5,852,233 A * | 12/1998 | Arnold et al. | 73/105 |
| 6,145,374 A | 11/2000 | Zypman Niechonski et al. | |
| 6,278,113 B1 | 8/2001 | Murayama et al. | |
| 6,479,817 B1 | 11/2002 | Yedur et al. | |
| 6,500,118 B1 | 12/2002 | Hashimoto | |
| 6,588,278 B1 | 7/2003 | Takishita et al. | |
| 6,694,817 B2 | 2/2004 | Degertekin et al. | |
| 7,000,475 B2 | 2/2006 | Oravecz et al. | |
| 7,055,378 B2 | 6/2006 | Su et al. | |
| 7,107,825 B2 | 9/2006 | Degertekin et al. | |
| 7,448,269 B2 * | 11/2008 | Shekhawat et al. | 73/603 |
| 2005/0056782 A1 * | 3/2005 | Shekhawat et al. | 250/306 |
| 2010/0011471 A1 * | 1/2010 | Jesse et al. | 850/21 |

OTHER PUBLICATIONS

Shekhawat, G. S. et al. "Nanoscale Imaging of Buried Structures via Scanning Near-Field Ultrasound Holography" Science, vol. 310, Oct. 7, 2005, pp. 89-92.*

(Continued)

*Primary Examiner*—Daniel S Larkin
(74) *Attorney, Agent, or Firm*—Andrea Z. Warmbier; Robin W. Edwards (57) ABSTRACT

A scanning probe microscope and methodology called resonant difference-frequency atomic force ultrasonic microscopy (RDF-AFUM), employs an ultrasonic wave launched from the bottom of a sample while the cantilever of an atomic force microscope, driven at a frequency differing from the ultrasonic frequency by one of the contact resonance frequencies of the cantilever, engages the sample top surface. The nonlinear mixing of the oscillating cantilever and the ultrasonic wave in the region defined by the cantilever tip-sample surface interaction force generates difference-frequency oscillations at the cantilever contact resonance. The resonance-enhanced difference-frequency signals are used to create images of nanoscale near-surface and subsurface features.

10 Claims, 2 Drawing Sheets

OTHER PUBLICATIONS

Cuberes, M. T. et al., "Heterodyne Force Microscopy of PMMA/Rubber Nanocomposites: Nanomapping of Viscoelastic Response at Ultrasonic Frequencies", Journal of Physics D: Applied Physics, vol. 33, No. 19, 2000, pp. 2347-2355.*

Yaralioglu, G. G. et al. "Contact Stiffness of Layered Materials for Ultrasonic Atomic Force Microscopy", Journal of Applied Physics, vol. 87, No. 10, May 15, 2000, pp. 7491-7496.*

* cited by examiner

RESONANT DIFFERENCE-FREQUENCY ATOMIC FORCE ULTRASONIC MICROSCOPE

This application claims the benefit of U.S. Patent Application No. 60/940,980, filed May 31, 2007, which is incorporated by reference herein in its entirety.

ORIGIN OF THE INVENTION

This invention was made in part by an employee of the United States Government and may be manufactured and used by or for the Government of the United States of America for governmental purposes without the payment of any royalties thereon.

FIELD OF THE INVENTION

The present invention generally relates to scanning probe microscopy, and, more particularly, relates to resonant difference-frequency atomic force ultrasonic microscopy for creating images of nanoscale near-surface and subsurface features of a sample.

BACKGROUND OF THE INVENTION

Figure 1:
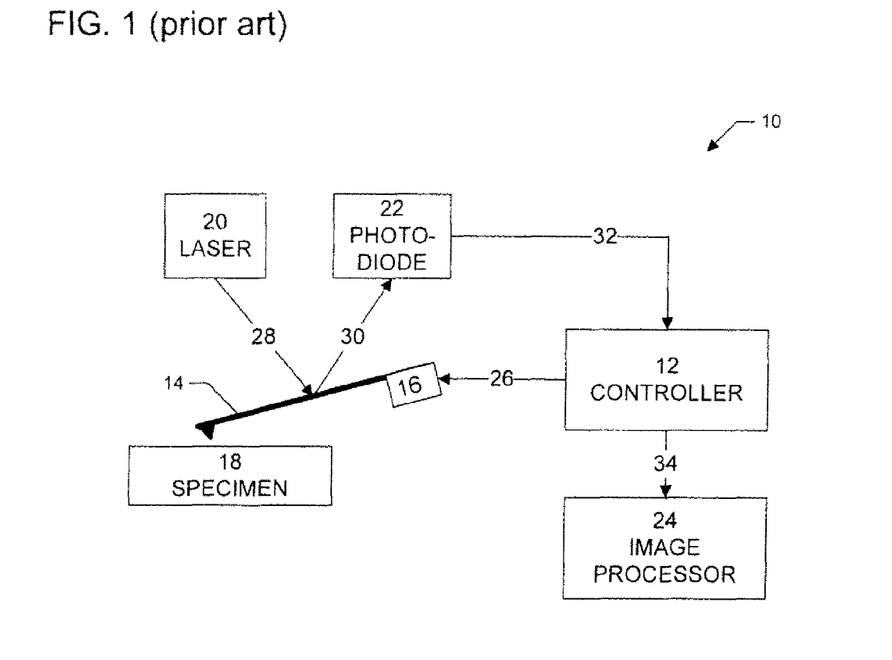
FIG. 1 is a block diagram of a prior art atomic force microscope.

Scanning probe microscopy (SPM) is a branch of microscopy that forms images of surfaces of a sample or specimen using a physical probe that scans the sample. An image of the surface is obtained by mechanically moving the probe in a raster (line by line) scan of the sample and recording the interaction between the probe and the sample surface as a function of the position of the probe relative to the surface of the sample. An atomic force microscope (AFM) is a high-resolution (nanometer resolution) type of SPM. Referring now to FIG. 1, a prior art AFM is illustrated. The AFM of FIG. 1 comprises a controller 12, a microscale cantilever 14 with a sharp tip (probe) at one end that is used to scan the surface of the sample 18, a laser 20, a photo-diode 22 (while the term photo-diode is used herein, an array of photo-diodes is typically used), and an image processor 24. The cantilever tip is often, but not necessarily, constructed of silicon. When the probe tip is brought into proximity of the sample surface, forces between the tip and the sample cause a deflection of the cantilever, and this deflection may be measured using the laser and photo-diode. A laser spot (illustrated by line 28) is reflected (illustrated by line 30) by the top of the cantilever onto the photo-diode, and the resulting electrical signal (illustrated by line 32) is sent to the controller 12. The deflection of the cantilever causes an amplitude change in the reflected laser spot (and in the resulting electrical signal), such that the amplitude at any specific time corresponds to the surface contour of the sample at a specific location on the sample. As this scanning is performed over the entire surface of the sample, the resulting amplitude data corresponds to the surface contour of the entire sample. The location and amplitude data is provided to the image processor (illustrated by line 34), such that the image processor is able to create an image of the surface of the sample.

The primary modes of operation of an AFM are static mode and dynamic mode. In the static mode operation, the static tip deflection is used as a feedback signal and the force between the tip and the surface is kept constant during scanning by maintaining a constant deflection. In the dynamic mode, the cantilever is externally oscillated at or close to its resonance frequency by an oscillator, such as piezoelectric stack 16. The oscillation of the piezo stack is controlled by a drive signal (illustrated by line 26) from the controller 12, with the frequency of the drive signal corresponding to the desired oscillation. The oscillation amplitude, phase and resonance frequency are modified by tip-sample interaction forces, and these changes in oscillation with respect to the external reference oscillation provide information about the sample's characteristics. Schemes for dynamic mode operation include frequency modulation and the more common amplitude modulation. In frequency modulation, changes in the oscillation frequency provide information about tip-sample interactions. Frequency can be measured with very high sensitivity and thus the frequency modulation mode allows for the use of very stiff cantilevers. Stiff cantilevers provide stability very close to the surface and, as a result, provide true atomic resolution in ultra-high vacuum conditions. In amplitude modulation, changes in the oscillation amplitude or phase provide the feedback signal for imaging. In amplitude modulation, changes in the phase of oscillation can be used to discriminate between different types of materials on the sample surface. Amplitude modulation can be operated either in the soft contact (non-linear) or in the hard contact (linear) regime. In ambient conditions, most samples develop a liquid meniscus layer. Because of this, keeping the probe tip close enough to the sample for short-range forces to become detectable while preventing the tip from sticking to the surface presents a major hurdle for the soft contact static mode in ambient conditions. Dynamic contact mode (also called intermittent contact or tapping mode) was developed to bypass this problem. In tapping mode, the cantilever is oscillated such that it comes into contact with the sample, and the cantilever drive provides a restoring force that causes the cantilever to oscillate about a setpoint separation between the cantilever tip and the sample surface.

The rapid development of new materials produced by the embedding of nanostructural constituents into matrix materials has placed increased demands on the development of new measurement methods and techniques to assess the microstructure-physical property relationships of such materials. Although known AFM techniques are available for surface characterization, methods to assess deeper (subsurface) features at the nanoscale are lacking.

BRIEF SUMMARY OF THE INVENTION

A scanning probe microscope and methodology, called resonant difference-frequency atomic force ultrasonic microscopy (RDF-AFUM), employs an ultrasonic wave launched from the bottom of a sample while the cantilever of an atomic force microscope, driven at a frequency differing from the ultrasonic frequency by one of the contact resonance frequencies of the cantilever, engages the sample top surface. The nonlinear mixing of the oscillating cantilever and the ultrasonic wave in the region defined by the cantilever tip-sample surface interaction force generates difference-frequency oscillations at the cantilever contact resonance. The resonance-enhanced difference-frequency signals are used to create images of nanoscale near-surface and subsurface features.

In one embodiment of the invention, an atomic force microscope is provided for examining sub-surface features embedded in a matrix material of a sample. The microscope comprises: (1) a cantilever arm having a plurality of contact resonance frequencies; (2) a probe secured to a free end of the cantilever arm; (3) an oscillator drive coupled to the cantilever arm and configured to oscillate the cantilever arm at a first frequency in response to a first drive signal; (4) a frequency generator located on an opposite side of the sample from the probe, the frequency generator configured to generate a signal at a second frequency in response to a second drive signal, the second frequency differing from the first frequency by an amount substantially equal to one of the contact resonance frequencies; (5) a deflection measuring mechanism configured to measure an amount of deflection of the cantilever arm as a surface of the sample is scanned and configured to generate a deflection signal indicative of the amount of deflection of the cantilever arm, the deflection signal comprising a first frequency component, a second frequency component, and a difference frequency component; and (6) a difference frequency component isolation element configured to isolate the difference frequency component of the deflection signal and to output at least one of (a) a phase of the difference frequency component, (b) a variation of the phase of the difference frequency component (e) an amplitude of the difference frequency component, or (d) a variation of the amplitude of the difference frequency component.

The microscope may further comprise an image processor configured to receive the output from the difference frequency component isolation element, the image processor further configured to create at least one of (a) an image of the phase of the difference frequency component relative to the sample surface or (b) an image of the amplitude of the difference frequency component relative to the sample surface.

The difference frequency component isolation element may comprise a mixing circuit and a lock-in amplifier. The mixing circuit may be configured to receive and mix the first and second drive signals and to output at least a difference frequency output. The lock-in amplifier may be configured to receive the output from the mixing circuit at a reference input and to receive the deflection signal at a signal input.

The microscope may further comprise a processing element configured to calculate a variation of a Young, modulus of the sample by performing the steps of: (1) calculating a variation of a sample contact stiffness constant using the variation of the phase of the difference frequency component; and (2) calculating the variation of the Young modulus using the calculated variation of the sample contact stiffness constant.

In addition to an atomic force microscope that employs an ultrasonic wave launched from the bottom of a sample as described above, other aspects of the present invention are directed to corresponding methods for atomic force microscopy employing an ultrasonic wave launched from the bottom of a sample.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Resonant difference-frequency atomic force ultrasonic microscopy (RDF-AFUM) of embodiments of the invention employs an ultrasonic wave launched from the bottom of a sample while the cantilever of an atomic force microscope, driven at a frequency differing from the ultrasonic frequency by one of the contact resonance frequencies of the cantilever, engages the sample top surface. At high drive amplitudes of the ultrasonic wave or cantilever (or both), the contact resonance frequency may also include a nonlinear oscillation mode of the cantilever. The nonlinear mixing of the oscillating cantilever and the ultrasonic wave in the region defined by the cantilever tip-sample surface interaction force generates difference-frequency oscillations at the contact resonance (linear or nonlinear) of the cantilever. Variations in the amplitude and phase of the bulk wave due to the presence of subsurface nano/microstructures, as well as variations in near-surface material parameters, affect the amplitude and phase of the difference-frequency signal. These variations are used to create spatial mappings of subsurface and near-surface structures of the sample.

Figure 2:
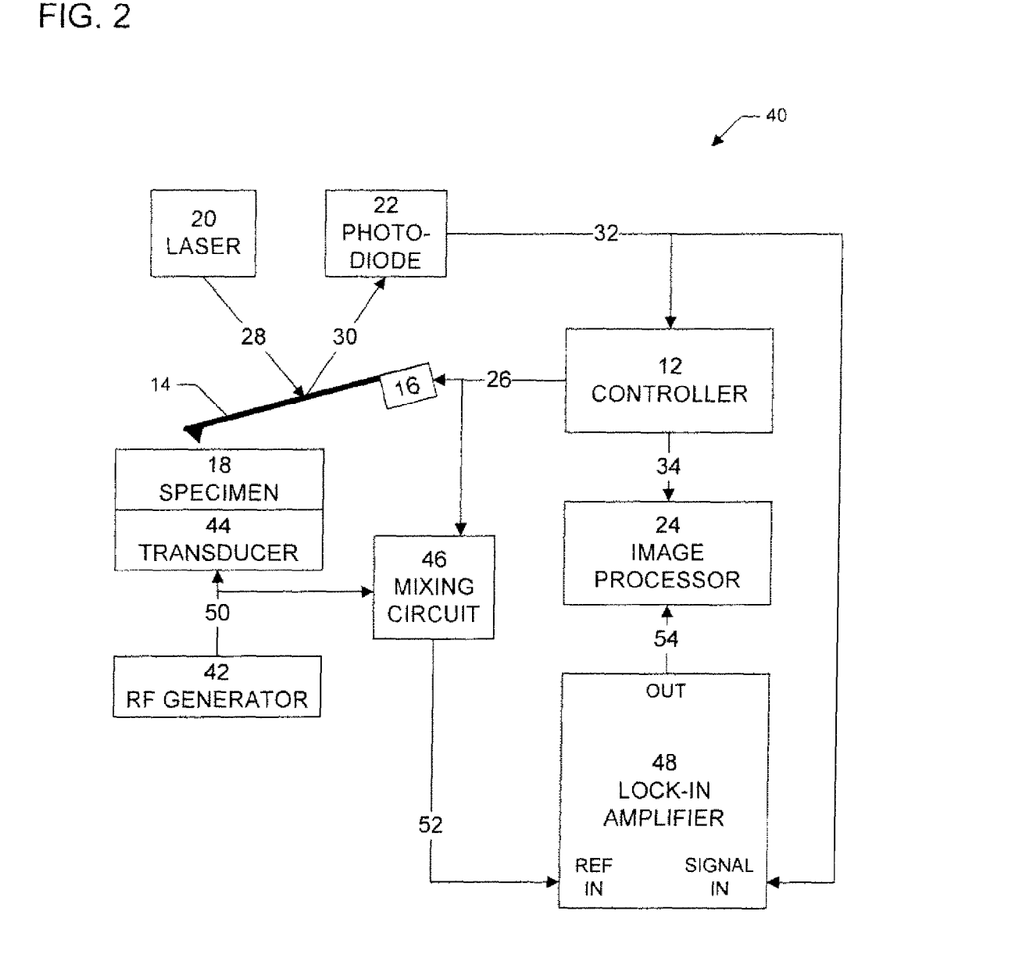
FIG. 2 is a block diagram of an atomic force microscope, in accordance with one embodiment of the present invention.

Referring now to FIG. 2, a block diagram of an atomic force microscope is illustrated, in accordance with one embodiment of the invention. Embodiments of the invention employ a known atomic force microscope, such as the microscope of FIG. 1, to which components have been added to produce resonance-enhanced difference-frequency signals that may be used to create images of nanoscale near-surface and subsurface features. Thus, the AFM 40 of FIG. 2 comprises a controller 12, a microscale cantilever 14 with a sharp tip (probe) at one end that is used to scan the surface of the sample 18, a piezo stack 16, a laser 20, a photo-diode 22, an image processor 24, a radio frequency (RF) generator 42, a transducer 44 located below the sample, a mixing circuit 46, and a lock-in amplifier 48. In one exemplary embodiment, the cantilever 14 has a flexural stiffness modulus of 14 Newton per meter (N/m) and a fundamental resonance of 302 kilohertz (kHz). The RF generator 42 sends a 1.8 megahertz (MHz) sinusoidal driving signal to the narrow-band piezoelectric transducer 44 bonded to the surface of the sample 18 opposite the cantilever, thus producing an ultrasonic wave that propagates through the sample. A drive signal (termed the cantilever drive signal) is sent to the cantilever (which is operating in intermittent soft contact mode) from the AFM controller 12 to the broad-band piezo stack 16 under the cantilever. The amplitude and frequency of the cantilever drive signal and the cantilever tip-sample surface separation are varied until the difference between the frequency of the ultrasonic wave and the cantilever drive frequency corresponds to one of the contact resonances (linear or nonlinear) of the cantilever. In this exemplary embodiment a cantilever drive frequency of 2.1 MHz and an ultrasonic drive frequency of 1.8 MHz generate a difference-frequency signal of approximately 0.3 MHz. This 0.3 MHz difference-frequency corresponds to a contact resonance of the cantilever.

The cantilever drive signal (illustrated by line 26) and transducer drive signal (illustrated by line 50) are split and fed to mixing circuit 46 (also termed a mixer). The mixer output signal (illustrated by line 52), which comprises sum and difference frequency signals, is sent to the reference input (labeled "REF IN") of a lock-in amplifier 48. The lock-in amplifier, because of its limited bandpass, filters out the sum frequency from the mixer output signal. The ACM photo-diode signal (illustrated by line 32), derived from the cantilever response from all sources (i.e., the cantilever drive frequency, the ultrasonic drive frequency, and the corresponding sum and difference frequencies), is sent to the signal input (labeled "SIGNAL IN") of the lock-in amplifier. By comparing the photodiode signal 32 to the difference frequency output of the mixer, the lock-in amplifier is able to filter from the photodiode signal all frequencies except the difference-frequency (this remaining difference frequency signal may be termed an input difference-frequency signal to distinguish it from the reference difference-frequency signal). The lock-in amplifier measures both the amplitude and phase of the input difference-frequency signal. Variations in the amplitude and/or phase of the input difference-frequency signal from that of the reference difference-frequency signal correspond to variations in sub-surface features of the sample. For example, variations in the phase of the input difference-frequency signal may correspond to variations in the elastic modulus, the adhesion coefficients, sound velocity, or diffraction effects of the sample. The output signal (labeled "OUT") from the lock-in amplifier, comprising the amplitude and phase of the input difference-frequency signal, is sent to the image processor 24 (illustrated by line 54). The image processor creates amplitude and/or phase images of the sample showing the sub-surface features of the sample. As discussed in more detail below, these variations in the sub-surface features of the sample may be quantified. Such a quantification may be performed, for example, in the AFM control 12 or in some other processor. Performing the quantification in the AFM control would typically require that the output from the lock-in amplifier be provided to the AFM control (not illustrated in FIG. 2).

Before commencing a scan, it is useful to determine the setpoint value of the feedback parameter that maximizes the amplitude of the difference-frequency signal. The intermittent soft contact mode may be operated while holding one of three parameters constant in the AFM feedback loop: (1) the quiescent deflection of the cantilever; (2) the amplitude of the cantilever's response to the piezo-drive signal ("normal" amplitude); or (3) the phase lag between the cantilever's response to the piezo-drive signal and the drive signal itself ("normal" phase). Calibration curves are taken in which the values of each of these possible feedback parameters are plotted together with the difference-frequency amplitude as a function of the cantilever tip-sample surface separation. From these curves a feedback parameter and a setpoint value are chosen to coincide with the maximum difference-frequency signal. Generally, the "normal" amplitude produces the most stable difference-frequency signal when used as the feedback parameter.

As the cantilever tip engages the sample surface, the tip encounters an interaction force that varies nonlinearly with the tip-surface separation distance. The deflection of the cantilever obtained in calibration plots is related to this force. For small slopes of the deflection versus separation distance, the interaction force and cantilever deflection curves are approximately related via a constant of proportionality. The maximum difference-frequency signal amplitude occurs when the quiescent deflection of the cantilever approaches the bottom of the force well, where the maximum change in the slope of the force versus separation curve (hence maximum interaction force nonlinearity) occurs.

The above description of RDF-AFUM provides that the difference-frequency signal results from the nonlinear interaction force between the oscillating cantilever tip and the sample surface vibrating in response to incident ultrasonic bulk waves generated at the bottom of the sample. It may be assumed image contrast is dominated by two principal contributions to the difference-frequency signal: (1) the variations in the amplitude and phase of the ultrasonic wave resulting from features within the sample bulk; and (2) the effects of variations in the sample surface contact stiffness on the nonlinear cantilever tip-sample surface interactions. Further discussion of the present invention is provided in S. A. Cantrell, J. H. Cantrell, and P. T. Lillehei, "Nanoscale Subsurface Imaging Via Resonant Difference-Frequency Atomic Force Ultrasonic Microscopy," J. Appl. Phys. 101, 114324 (2007), herein incorporated by reference in its entirety.

Consider a continuous ultrasonic wave propagating through a material of finite thickness and the variations in amplitude and phase of the wave resulting from structural features embedded within the bulk of the sample. As the ultrasonic wave impinges upon the sample surface it mixes with the cantilever oscillations via the nonlinear tip-surface interaction force to generate a difference-frequency signal. The amplitude and phase variations generated in the bulk material are carried to the sample surface by the propagating ultrasonic wave and become an integral part of the ultrasonic wave contribution to variations in the difference-frequency signal. Sample near-surface features also contribute to the difference-frequency signal via the effect of the contact stiffness associated with such features directly on the nonlinear cantilever tip-sample surface interaction itself. The near-surface contributions include not only those produced at the cantilever drive frequency and manifested in the difference-frequency signal via the nonlinear tip-surface interaction, but also those generated by the difference-frequency drive signal itself.

Consider a traveling stress wave of unit amplitude of the form $e^{-\alpha x}\cos(\omega_s t - kx) = \text{Re}[e^{-\alpha x}e^{i(\omega_s t - kx)}]$, where $\alpha$ is the attenuation coefficient, x is the propagation distance, $\omega_s$ is the angular frequency, t is time, $k = \omega_s/c$, and c is the phase velocity, propagating through a sample of thickness a/2. It may be assumed that the wave is generated at the bottom surface of the sample at the position x=0 and that the wave is reflected between the top and bottom surfaces of the sample. It may further be assumed that the effect of the reflections is simply to change the direction of wave propagation; chances in the sign of the wave amplitude at each reflection produce an inconsequential phase shift in the final results.

For continuous waves, the complex waveform at a point x in the material comprises the sum of all contributions resulting from waves which had been generated at the point x=0 and have propagated to the point x after multiple reflections from the sample boundaries. The complex wave $\tilde{A}(t)$ may thus be written as:

$$\tilde{A}(t) = e^{-\alpha x}e^{i(\omega_s t - kx)}[1 + e^{-(\alpha a + ika)} + \cdots + e^{-N(\alpha a + ika)} + \cdots] \quad \text{(Eq. 1)}$$

$$= e^{-\alpha x}e^{i(\omega_s t - kx)}\sum_{N=0}^{\infty}[e^{-(\alpha a + ika)}]^N$$

$$= e^{-\alpha x}e^{i(\omega_s t - kx)}\frac{1}{1 - e^{-(\alpha a + ika)}},$$

where the last equality in this equation follows from the geometric series generated by the infinite sum. The real waveform A(t) is obtained from Eq. 1 as:

$$A(t) = \text{Re}[\tilde{A}(t)] \quad \text{(Eq. 2)}$$
$$= e^{-\alpha x}(A_1^2 + A_2^2)^{1/2} \cos(\omega_s t - kx - \phi)$$
$$= e^{-\alpha x} B \cos(\omega_s t - kx - \phi)$$

where $$A_1 = \frac{e^{\alpha a} - \cos ka}{2(\cosh \alpha a - \cos ka)}, \quad \text{(Eq. 3)}$$

$$A_2 = \frac{\sin ka}{2(\cosh \alpha a - \cos ka)}, \quad \text{(Eq. 4)}$$

$$\phi = \tan^{-1} \frac{\sin ka}{e^{\alpha a} - \cos ka}, \quad \text{(Eq. 5)}$$

and $$B = (A_1^2 + A_2^2)^{1/2} \quad \text{(Eq. 6)}$$
$$= (1 + e^{-2\alpha a} - 2e^{-\alpha a} \cos ka)^{-1/2}.$$

The evaluation (detection) of a continuous wave at the end of the sample opposite that of the source is obtained by setting $x=a/2$ in the above equations. It is at $x=a/2$ that the AFM cantilever engages the sample surface. In the following equations, x is set to=a/2.

The above results are derived for a homogeneous sample. Consider now that the sample of thickness $a/2$ having phase velocity c contains embedded material of thickness $d/2$ having phase velocity $c_d$. The phase factor $ka=\omega_s a/c$ in Equations 2-6 are then replaced by $ka-\psi$ where $$\psi = \omega_s d \left( \frac{1}{c} - \frac{1}{c_d} \right) \quad \text{(Eq. 7)}$$
$$= \omega_s d \frac{\Delta c}{c_d c}$$
$$= kd \frac{\Delta c}{c_d}$$

and $\Delta c = c_d - c$. Setting $x=a/2$ and re-writing Equations 2, 5, and (6) results in:

$$A'(t) = e^{-\alpha a/2} B' \cos\left[\omega_s t - \frac{(ka - \psi)}{2} - \phi'\right], \quad \text{(Eq. 8)}$$

where $$\phi' = \tan^{-1} \frac{\sin(ka - \psi)}{e^{\alpha a} - \cos(ka - \psi)}, \quad \text{(Eq. 9)}$$

and $$B' = [1 + e^{-2\alpha a} - 2e^{-\alpha a} \cos(ka - \psi)]^{-1/2}. \quad \text{(Eq. 10)}$$

It has been assumed in obtaining the above equations that the change in the attenuation coefficient resulting from the embedded material is negligible.

For small $\psi$, Equation 9 may be expanded in a power series about $\psi=0$. Keeping only terms to first order results in:

$$\phi' = \phi + \Delta\phi, \quad \text{(Eq. 11)}$$

where $$\Delta\phi = -\psi \left[ \frac{e^{\alpha a} \cos ka - 1}{(e^{\alpha a} - \cos ka)^2 + \sin^2 ka} \right]. \quad \text{(Eq. 12)}$$

Equation 8 is thus approximated as:

$$A'(t) = e^{-\alpha a/2} B' \cos\left(\omega_s t - \frac{ka}{2} - \phi + \frac{\psi}{2} - \Delta\phi\right) \quad \text{(Eq. 13)}$$
$$= e^{-\alpha a/2} B' \cos(\omega_s t + \theta),$$

where $$\theta = -(\chi + \Delta\chi) \quad \text{(Eq. 14)}$$
$$= -\left(\frac{ka}{2} + \phi - \frac{\psi}{2} + \Delta\phi\right),$$

$$\chi = \frac{ka}{2} + \phi, \quad \text{(Eq. 15)}$$

and $$\Delta\chi = -\frac{\psi}{2} + \Delta\phi \quad \text{(Eq. 16)}$$
$$= -\psi\left[\frac{1}{2} + \frac{e^{\alpha a} \cos ka - 1}{(e^{\alpha a} - \cos ka)^2 + \sin^2 ka}\right].$$

Equation 13 reveals that the total phase contribution at $x=a/2$ is $\theta$ and, from Equations 14 and 16, that the phase variation resulting from embedded material is $-\Delta\chi$.

The fractional change in the Young modulus $\Delta E/E$ is related to the fractional change in the ultrasonic longitudinal velocity $\Delta c/c$ as $\Delta E/E \approx \Delta C_{11}/C_{11} = (2\Delta c/c) + (\Delta\rho/\rho)$ where $\rho$ is the mass density of the sample and $C_{11}$ is the Brugger longitudinal elastic constant. Assuming that the Fractional change in the mass density is small compared to the fractional change in the wave velocity, the relationship between $\Delta E/E$ and $\Delta c/c$ may be estimated as $\Delta E/E \approx 2\Delta c/c$. This relationship may be used to express $\psi$, given in Equation 7 in terms of $\Delta c/c_d = (c/c_d)(\Delta c/c)$, in terms of $\Delta E/E$.

In addition to that from embedded material, a phase shift in the RDF-AFUM signal occurs directly from the nonlinear cantilever tip-sample surface interaction that generates an effective driving force for sample surface oscillations at the difference frequency. The surface contributions include not only those produced at the cantilever drive frequency and manifested in the difference-frequency signal via the nonlinear tip-surface interaction, but also those generated by an effective difference-frequency drive signal itself. The phase shift at the difference-frequency generated by the effective difference-frequency drive signal itself may be obtained by considering that the small mass $m_s$, of sample material involved in the cantilever-sample tip interaction adheres to a good approximation the damped harmonic oscillator equation $$m_s \ddot{z} + \gamma_s \dot{z} + [k_s + F'(z_0)]z = F \cos(\Delta\omega)t = Re[Fe^{i(\Delta\omega)t}] \quad \text{(Eq. 17)},$$

where the difference frequency $\Delta\omega = (\omega_c - \omega_s)$, $\omega_c$ is the cantilever frequency, $\omega_s$ is the ultrasonic frequency, $\gamma_s$ is the damping coefficient, $k_s$ is the sample contact stiffness constant, F is the amplitude of the driving force, z is the instantaneous tip-surface separation distance, and $F'(z_0)$ is the effective stiffness constant of the nonlinear interaction force at the quiescent cantilever tip-sample surface separation distance $z_0$.

When the quiescent separation distance $z_0$ is less than that corresponding to the bottom of the force-separation curve, $F'(z_0)$ is negative, and when the quiescent separation distance $z_0$ is greater than that corresponding to the bottom of the force-separation curve, $F'(z_0)$ is positive. When operating in the nonlinear interaction (soft contact) region of the cantilever tip-sample surface force-separation curve, $F'(z_0)$ is generally small compared to that of the hard tip-surface contact region but can be significant in the RDF-AFUM signal calculations, especially for small values of $k_s$ and cantilever stiffness constant $k_c$. Assuming that the mass $m_s$ is negligibly small, the steady state solution to Equation 17 is:

$$z = \mathrm{Re}\left(\frac{F e^{i(\Delta\omega)t}}{k_s + F'(z_0) + i\gamma_s \Delta\omega}\right) \qquad (\text{Eq. 18})$$

$$= \frac{F}{[(k_s + F'(z_0))^2 + \gamma_s^2(\Delta\omega)^2]^{1/2}}\cos[(\Delta\omega)t - \beta_{cs}],$$

where $$\beta_{cs} = \tan^{-1}\frac{\gamma_s \Delta\omega}{k_s + F'(z_0)}. \qquad (\text{Eq. 19})$$

Consider now that the sample contact stiffness constant may vary from point to point on the sample surface. It may be assumed that the value of the sample contact stiffness constant $k'_s$ at a given point on the surface differs from the value $k_s$ at another position as $k'_s = k_s + \Delta k_s$. The value of the phase factor resulting from the change in the contact stiffness constant is obtained by substituting the value of $k'_s$ into Equation 19 to obtain:

$$\beta'_{cs} = \tan^{-1}\frac{\gamma_s \Delta\omega}{k_s + F'(z_0) + \Delta k_s}. \qquad (\text{Eq. 20})$$

For small values of $\Delta k_s$, Equation 20 may be expanded in a power series about $\Delta k_s = 0$ to obtain:

$$\beta'_{cs} = \beta_{cs} + \Delta\beta_{cs} \qquad (\text{Eq. 21})$$

where $$\Delta\beta_{cs} = \left(\frac{d\beta'_{cs}}{d(\Delta k_s)}\right)_0 \Delta k_s = -\left(\frac{\gamma_s \Delta\omega}{[k_s + F'(z_0)]^2 + \gamma_s^2(\Delta\omega)^2}\right)\Delta k_s. \qquad (\text{Eq. 22})$$

The surface contributions also include those produced at the cantilever drive frequency $\omega_c$ and manifested in the difference-frequency signal via the nonlinear tip-surface interaction in a manner similar to that from the ultrasonic wave interaction. The resulting phase contribution may be obtained by considering that the cantilever-sample tip interaction adheres to a good approximation the damped harmonic oscillator equation given by Equation 17 in which $\Delta\omega$ is replaced by the cantilever drive frequency $\omega_c$. The solution of the equation results in a phase contribution $\alpha_{cc}$ to the difference-frequency given as:

$$\alpha_{cc} = \tan^{-1}\frac{\gamma_s \omega_c}{k_s + F'(z_0)}. \qquad (\text{Eq. 23})$$

For materials having variations $\Delta k_s$ in the sample contact stiffness constant $k_s$, the variation $\Delta\alpha_{cc}$ in $\alpha_{cc}$ is given as:

$$\Delta\alpha_{cc} = \frac{\gamma_s \omega_c}{[k_s + F'(z_0)]^2 + \gamma_s^2 \omega_c^2}\Delta k_s. \qquad (\text{Eq. 24})$$

Three other terms are obtained from an analytical model that results from the mathematical details of the nonlinear interaction. These terms are:

$$\phi_{cs} \approx \tan^{-1}\frac{(\gamma_c k_s + \gamma_s k_{cp})(\Delta\omega) - \gamma_s m_c (\Delta\omega)^3 +}{k_{cp}k_s - (m_c k_s + \gamma_c \gamma_s)(\Delta\omega)^2 +}, \qquad (\text{Eq. 25})$$
$$\phantom{\phi_{cs} \approx \tan^{-1}\frac{}{}}\frac{F'(z_0)(\gamma_c + \gamma_s)(\Delta\omega)}{F'(z_0)[k_{cp} + k_s - m_c(\Delta\omega)^2]}$$

where $k_{cp}$ is the cantilever stiffness constant corresponding to the $p^{th}$ (linear or nonlinear) non-contact resonance mode of the cantilever having a frequency nearest $\Delta\omega$ and $\gamma_c$ is the cantilever damping coefficient:

$$\phi_{cc} \approx \tan^{-1}\frac{(\gamma_c k_s + \gamma_s k_{cq})\omega_c - \gamma_s m_c \omega_c^3 +}{k_{cq}k_s - (m_c k_s + \gamma_c \gamma_s)\omega_c^2 +}; \qquad (\text{Eq. 26})$$
$$\phantom{\phi_{cc} \approx \tan^{-1}\frac{}{}}\frac{F'(z_0)(\gamma_c + \gamma_s)\omega_c}{F'(z_0)(k_{cq} + k_s - m_c\omega_c^2)}$$

and $$\phi_{ss} \approx \tan^{-1}\frac{(\gamma_c k_s + \gamma_s k_{cr})\omega_s - \gamma_s m_c \omega_s^3 +}{k_{cr}k_s - (m_c k_s + \gamma_c \gamma_s)\omega_s^2 +}, \qquad (\text{Eq. 27})$$
$$\phantom{\phi_{ss} \approx \tan^{-1}\frac{}{}}\frac{F'(z_0)(\gamma_c + \gamma_s)\omega_s}{F'(z_0)(k_{cr} + k_s - m_c\omega_s^2)}$$

where $k_{cq}$ and $k_{cr}$ are the cantilever stiffness constants corresponding to the $q^{th}$ and $r^{th}$ non-contact resonance modes of the cantilever having frequencies nearest $\omega_c$ and $\omega_s$, respectively. The variations in these terms resulting from variations in $k_s$ are:

(a) $\quad \Delta\phi_{cc} = -\dfrac{A_{cc}}{B_{cc}}\Delta k_s$, where $\qquad (\text{Eq. 28})$ $$A_{cc} = [\gamma_s k_{cq}^2 + 2F'(z_0)\gamma_s k_{cq} + F'(z_0)^2(\gamma_c + \gamma_s)] \qquad (\text{Eq. 29})$$
$$\omega_c + [\gamma_c^2 \gamma_s - 2\gamma_s m_c(k_{cq} + F'(z_0))]\omega_c^3 + m_c^2 \gamma_s \omega_c^5 \text{ and}$$

$$B_{cc} = \{[\gamma_c k_s + \gamma_s k_{cq} + F'(z_0)(\gamma_c + \gamma_s)]\omega_c - \gamma_s m_c \omega_c^2\}^2 + \qquad (\text{Eq. 30})$$
$$\{[k_{cq} - m_c \omega_c^2 + F'(z_0)]k_s + F'(z_0)(k_{cq} - m_c \omega_c^2) - \gamma_c \gamma_s \omega_c^2\}^2;$$

(b) $\quad \Delta\phi_{ss} = -\dfrac{A_{ss}}{B_{ss}}\Delta k_s$, where $\qquad (\text{Eq. 31})$ $$A_{ss} = [\gamma_s k_{cr}^2 + 2F'(Z_0)\gamma_s k_{cr} + F'(z_0)^2(\gamma_c + \gamma_s)] \qquad (\text{Eq. 32})$$
$$\omega_s + [\gamma_c^2 \gamma_s - 2\gamma_s m_c(k_{cr} + F'(z_0))]\omega_s^3 + m_c^2 \gamma_s \omega_s^5 \text{ and}$$

$$B_{ss} = \{[\gamma_c k_s + \gamma_s k_{cr} + F'(z_0)(\gamma_c + \gamma_s)]\omega_c - \gamma_s m_c \omega_s^3\}^2 + \qquad (\text{Eq. 33})$$
$$\{[k_{cr} - m_c \omega_s^2 + F'(z_0)]k_s + F'(z_0)(k_{cr} - m_c \omega_s^2) - \gamma_c \gamma_s \omega_s^2\}^2;$$

and (c) $\quad \Delta\phi_{cs} = -\dfrac{A_{cs}}{B_{cs}}\Delta k_s$, where $\qquad (\text{Eq. 34})$ -continued $$A_{cs} = [\gamma_s k_{cp}^2 + 2F'(z_0)\gamma_s k_{cp} + F'(z_0)^2(\gamma_c + \gamma_s)](\Delta\omega) + [ \quad \text{(Eq. 35)}$$
$$\gamma_c^2\gamma_s - 2\gamma_s m_c(k_{cp} + F'(z_0))](\Delta\omega)^3 + m_c^2\gamma_s(\Delta\omega)^5 \text{ and}$$

$$B_{cs} = \left\{ \left[ \frac{\gamma_c k_s + \gamma_s k_{cp} +}{F'(z_0)(\gamma_c + \gamma_s)} \right](\Delta\omega) - \gamma_s m_c(\Delta\omega)^3 \right\}^2 + \quad \text{(Eq. 36)}$$
$$\left\{ \left[ \begin{array}{c} k_{cp} - m_c(\Delta\omega)^2 + \\ F'(z_0) \\ F'(z_0)[k_{cp} - m_c(\Delta\omega)^2] - \gamma_c\gamma_s(\Delta\omega)^2 \end{array} \right] k_s + \right\}^2.$$

The total near-surface phase contribution $(\Omega_{tot}+\Delta\Omega_{tot})$ to the difference-frequency signal is:

$$\Omega_{tot}+\Delta\Omega_{tot}=(\beta_{cs}+\alpha_{cc}+\phi_{ss}-\phi_{cc}-\phi_{cs})+(\Delta\beta_{cs}+\Delta\alpha_{cc}+\Delta\phi_{ss}-\Delta\phi_{cc}-\Delta\phi_{cs}) \quad \text{(Eq. 37)},$$

where the set of terms within the first parenthesis on the right side of Equation 37 is $\Omega_{tot}$ and the set within the second parenthesis is $\Delta\Omega_{tot}$. The contribution $(\Omega_{tot}+\Delta\Omega_{tot})$ is added to the phase contribution $(-\theta)$ from the bulk wave to give the net phase contribution to the difference-frequency signal.

Hertzian contact theory provides that the isotropic sample contact stiffness $k_s$ is related to the Young modulus E of the sample as:

$$k_s = 2r_c \left( \frac{1-\nu_T^2}{E_T} + \frac{1-\nu^2}{E} \right)^{-1}, \quad \text{(Eq. 38)}$$

where $E_T$ is the Young modulus of the cantilever tip, $\nu$ and $\nu_T$ are the Poisson ratios of the sample and cantilever tip, respectively, and $r_c$ is the cantilever tip-sample surface contact radius. From Equation 38, the following equation may be obtained:

$$\Delta k_s = \frac{2r_c(1-\nu^2)}{E^2} \left( \frac{1-\nu_T^2}{E_T} + \frac{1-\nu^2}{E} \right)^{-2} \Delta E. \quad \text{(Eq. 39)}$$

The phase terms $-\theta$ and $(\Omega_{tot}+\Omega_{tot})$, given by Equations 14 and 37, directly contribute to the net phase of the RDF-AFUM signal. The negative sign before $\theta$ occurs because the contribution from the ultrasonic bulk wave having frequency $\omega_s$ appears as the $-\omega_s$ component in the difference-frequency signal $\Delta\omega=(\omega_c-\omega_s)$. The phase output signal from the lock-in amplifier is proportional to $-\sin(\Omega_{tot}+\Delta\Omega_{tot}-\theta)=-\sin(\Omega_{tot}+\chi+\Delta\Omega_{tot}+\Delta\chi)$. Thus, for $[2n-(1/2)]\pi<(\Omega_{tot}+\chi)<[2n+(1/2)]\pi$, where n is an integer, a negative value of $(\Delta\Omega_{tot}+\Delta\chi)$ at a given point in the image produces an increase in the phase output signal at that point, whereas for $[2n+(1/2)]\pi(\Omega_{tot}+\chi)<[2n+(3/2)]\pi$ a negative value of $(\Delta\Omega_{tot}+\Delta\chi)$ at a given point produces a decrease in the signal. The changes in the lock-in amplifier phase output signal resulting from the phase shift $(\Delta\Omega_{tot}+\Delta\chi)$ provide the image contrast in RDF-AFUM using phase detection.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed as new and desired to be secured by Letters Patent of the United States is:

1. An atomic force microscope for examining sub-surface features embedded in a matrix material of a sample, the microscope comprising:
    a cantilever arm having a plurality of contact resonance frequencies;
    a probe secured to a free end of the cantilever arm;
    a first oscillator drive coupled to the cantilever arm and configured to oscillate the cantilever arm at a first frequency in response to a first drive signal;
    a second oscillator drive adapted to be coupled to the sample on an opposite side of the sample from the probe, the second oscillator drive configured to generate a signal at a second frequency in response to a second drive signal, the second frequency differing from the first frequency by an amount substantially equal to one of the contact resonance frequencies;
    a deflection measuring mechanism configured to measure an amount of deflection of the cantilever arm as a surface of the sample is scanned and configured to generate a deflection signal indicative of the amount of deflection of the cantilever arm, the deflection signal comprising a first frequency component, a second frequency component, and a difference frequency component; and
    a difference frequency component isolation element configured to isolate the difference frequency component of the deflection signal and to output at least one of (a) a phase of the difference frequency component, (b) a variation of the phase of the difference frequency component, (c) an amplitude of the difference frequency component, or (d) a variation of the amplitude of the difference frequency component.

2. The microscope of claim 1, further comprising:
    an image processor configured to receive the output from the difference frequency component isolation element, the image processor further configured to create at least one of (a) an image of the phase of the difference frequency component relative to the sample surface or (b) an image of the amplitude of the difference frequency component relative to the sample surface.

3. The microscope of claim 1, wherein the difference frequency component isolation element comprises:
    a mixing circuit configured to receive and mix the first and second drive signals and further configured to output at least a difference frequency output; and
    a lock-in amplifier configured to receive the output from the mixing circuit at a reference input and to receive the deflection signal at a signal input.

4. An atomic force microscope for examining sub-surface features embedded in a matrix material of a sample, the microscope comprising:
    a cantilever arm having a plurality of contact resonance frequencies;
    a probe secured to a free end of the cantilever arm;
    a first oscillator drive coupled to the cantilever arm and configured to oscillate the cantilever arm at a first frequency in response to a first drive signal;
    a second oscillator drive adapted to be coupled to the sample on an opposite side of the sample from the probe, the second oscillator drive configured to generate a signal at a second frequency in response to a second drive signal, the second frequency differing from the first frequency by an amount substantially equal to one of the contact resonance frequencies;

a deflection measuring mechanism configured to measure an amount of deflection of the cantilever arm as a surface of the sample is scanned and configured to generate a deflection signal indicative of the amount of deflection of the cantilever arm, the deflection signal comprising a first frequency component, a second frequency component, and a difference frequency component;

a difference frequency component isolation element configured to isolate the difference frequency component of the deflection signal and to output at least one of (a) a phase of the difference frequency component, (b) a variation of the phase of the difference frequency component, (c) an amplitude of the difference frequency component, or (d) a variation of the amplitude of the difference frequency component; and a processing element configured to calculate a variation of a Young modulus of the sample by performing the steps of calculating a variation of a sample contact stiffness constant using the variation of the phase of the difference frequency component, and calculating the variation of the Young modulus using the calculated variation of the sample contact stiffness constant.

5. The microscope of claim 4, wherein the variation of the sample contact stiffness constant $\Delta k_s$ is calculated using equation $$\Delta \Omega_{tot} = (\Delta \beta_{cs} + \Delta \alpha_{cc} + \Delta \phi_{ss} - \Delta \phi_{cc} - \Delta \phi_{cs}),$$

where $$\Delta \beta_{cs} = -\left(\frac{\gamma_s \Delta \omega}{[k_s + F'(z_0)]^2 + \gamma_s^2 (\Delta \omega)^2}\right) \Delta k_s;$$

$$\Delta \alpha_{cc} = \frac{\gamma_s \omega_c}{[k_s + F'(z_0)]^2 + \gamma_s^2 \omega_c^2} \Delta k_s;$$

$$\Delta \phi_{ss} = -\frac{A_{ss}}{B_{ss}} \Delta k_s; \Delta \phi_{cc} = -\frac{A_{cc}}{B_{cc}} \Delta k_s; \Delta \phi_{cs} = -\frac{A_{cs}}{B_{cs}} \Delta k_s;$$

$$A_{cc} = [\gamma_s k_{cq}^2 + 2F'(z_0)\gamma_s k_{cq} + F'(z_0)^2(\gamma_c + \gamma_s)]$$
$$\omega_c + [\gamma_c^2 \gamma_s - 2\gamma_s m_c (k_{cq} + F'(z_0))]\omega_c^3 + m_c^2 \gamma_s \omega_c^5;$$

$$B_{cc} = \{[\gamma_c k_s + \gamma_s k_{cq} + F'(z_0)(\gamma_c + \gamma_s)]\omega_c - \gamma_s m_c \omega_c^3\}^2 +$$
$$\{[k_{cq} - m_c \omega_c^2 + F'(z_0)]k_s + F'(z_0)(k_{cq} - m_c \omega_c^2) - \gamma_c \gamma_s \omega_c^2;$$

$$A_{ss} = [\gamma_s k_{cr}^2 + 2F'(z_0)\gamma_s k_{cr} + F'(z_0)^2(\gamma_c + \gamma_s)]\omega_s + [\gamma_c^2 \gamma_s -$$
$$2\gamma_s m_c (k_{cr} + F'(z_0))]\omega_s^3 + m_c^2 \gamma_s \omega_s^5;$$

$$B_{ss} = \{[\gamma_c k_s + \gamma_s k_{cr} + F'(z_0)(\gamma_c + \gamma_s)]\omega_s - \gamma_s m_c \omega_s^3\}^2 +$$
$$\{[k_{cr} - m_c \omega_s^2 + F'(z_0)]k_s + F'(z_0)(k_{cr} - m_c \omega_s^2) - \gamma_c \gamma_s \omega_s^2;$$

$$A_{cs} = [\gamma_s k_{cp}^2 + 2F'(z_0)\gamma_s k_{cp} + F'(z_0)^2(\gamma_c + \gamma_s)](\Delta \omega) + [\gamma_c^2 \gamma_s -$$
$$2\gamma_s m_c (k_{cp} + F'(z_0))](\Delta \omega)^3 + m_c^2 \gamma_s (\Delta \omega);$$

$\gamma_s$ is a damping coefficient of the sample; $\Delta \omega = (\omega_c - \omega_s)$, $\omega_s$ is the first frequency, $\omega_s$ is the second frequency; $F'(z_0)$ is an effective stiffness constant of a nonlinear interaction force at a quiescent cantilever tip-sample surface separation distance $z_0$; $k_{cp}$ is a cantilever stiffness constant corresponding to a $p^{th}$ linear or nonlinear non-contact resonance mode of the cantilever having a frequency nearest $\Delta \omega$; $\gamma_c$ is a cantilever damping coefficient; $m_c$ is an effective mass of the cantilever; $k_{cq}$ is a cantilever stiffness constant corresponding to a $q^{th}$ non-contact resonance mode of the cantilever having a frequency nearest $\omega_c$; and $k_{cr}$ is a cantilever stiffness constant corresponding to an $r^{th}$ non-contact resonance mode of the cantilever having a frequency nearest $\omega_s$;

wherein the variation in the Young modulus $\Delta E$ from the sample surface is calculated using equations $$\Delta \Omega_{tot} = (\Delta \beta_{cs} + \Delta \alpha_{cc} + \Delta \phi_{ss} - \Delta \phi_{cc} - \Delta \phi_{cs}), \text{ and}$$

$$\Delta k_s = (1 - \nu^2)(6 E^{*-1} RF)^{1/3} (E^*/E)^2 \Delta E, \text{ where}$$

k is a wave number of the frequency generator signal; c is a sound velocity of the matrix material; $c_d$ is a sound velocity of a subsurface feature; E is a Young modulus of the matrix material;

$$E^* = \left(\frac{1-\nu^2}{E} + \frac{1-\nu_T^2}{E_T}\right)^{-1}$$

is a reduced Young modulus where $\nu$ is a Poisson ratio of the matrix material, $\nu_T$ is a Poisson ratio of the cantilever tip, and $E_T$ is a Young modulus of the cantilever tip; and equating $\Delta \Omega_{tot}$ to a measured variation of the phase of the difference-frequency component; and wherein the variation in the Young modulus $\Delta E$ from a sample subsurface feature is calculated using the equation $$\Delta \chi = -\frac{kdc}{2c_d E}\left[\frac{1}{2} + \frac{e^{\alpha a}\cos ka - 1}{(e^{\alpha a} - \cos ka)^2 + \sin^2 ka}\right]\Delta E$$

and equating $\Delta \chi$ to a measured variation of the phase of the difference-frequency component; and wherein the variation in the Young modulus is further calculated by summing $\Delta \Omega_{tot}$ and $\Delta \chi$ if the sample surface and subsurface variations in the Young modulus are substantially the same and equating the sum to a measured variation of the phase of the difference-frequency component.

6. A method for examining sub-surface features embedded in a matrix material of a sample, the method comprising the steps of:

providing an atomic force microscope comprising:
a cantilever aim having a plurality of contact resonance frequencies;
a probe secured to a free end of the cantilever arm;
a first oscillator drive coupled to the cantilever arm;
a second oscillator drive coupled to the sample on an opposite side of the sample from the probe;
a deflection measuring mechanism; and
a difference frequency component isolation element;
oscillating, by the first oscillator drive, the cantilever arm at a first frequency in response to a first drive signal;
oscillating, by the second oscillator drive, the sample, at a second frequency in response to a second drive signal, the second frequency differing from the first frequency by an amount substantially equal to one of the contact resonance frequencies;
measuring, by the deflection measuring mechanism, an amount of deflection of the cantilever arm as a surface of the sample is scanned;
generating, by the deflection measuring mechanism, a deflection signal indicative of the amount of deflection of the cantilever arm, the deflection signal comprising a first frequency component, a second frequency component, and a difference frequency component;

isolating, by the difference frequency component isolation element, the difference frequency component of the deflection signal; and outputting, by the difference frequency component isolation element, at least one of (a) a phase of the difference frequency component, (b) a variation of the phase of the difference frequency component, (c) an amplitude of the difference frequency component, or (d) a variation of the amplitude of the difference frequency component.

7. The method of claim 6, wherein the atomic force microscope further comprises an image processor, and wherein the method further comprises the step of:

receiving, by the image processor, the output from the difference frequency component isolation element; and creating, by the image processor, at least one of (a) an image of the phase of the difference frequency component relative to the sample surface or (b) an image of the amplitude of the difference frequency component relative to the sample surface.

8. The method of claim 6, wherein the difference frequency component isolation element comprises a mixing circuit and a lock-in amplifier, and wherein the step of isolating the difference frequency component of the deflection signal further comprises the steps of:

receiving and mixing, by the mixing circuit, the first and second drive signals;

outputting, by the mixing circuit, at least a difference frequency output;

receiving, by the lock-in amplifier, the output from the mixing circuit at a reference input and the deflection signal at a signal input.

9. A method for examining sub-surface features embedded in a matrix material of a sample, the method comprising the steps of:

providing an atomic force microscope comprising:
- a cantilever aim having a plurality of contact resonance frequencies;
- a probe secured to a free end of the cantilever arm;
- a first oscillator drive coupled to the cantilever arm;
- a second oscillator drive coupled to the sample on an opposite side of the sample from the probe;
- a deflection measuring mechanism; and
- a difference frequency component isolation element;

oscillating, by the first oscillator drive, the cantilever arm at a first frequency in response to a first drive signal;

oscillating, by the second oscillator drive, the sample at a second frequency in response to a second drive signal, the second frequency differing from the first frequency by an amount substantially equal to one of the contact resonance frequencies;

measuring, by the deflection measuring mechanism, an amount of deflection of he cantilever arm as a surface of the sample is scanned;

generating, by the deflection measuring mechanism, a deflection signal indicative of the amount of deflection of the cantilever arm, the deflection signal comprising a first frequency component, a second frequency component, and a difference frequency component; isolating, by the difference frequency component isolation element, the difference frequency component of the deflection signal; outputting, by the difference frequency component isolation element, at least one of (a) a phase of the difference frequency component, (b) a variation of the phase of the difference frequency component, (c) an amplitude of the difference frequency component, or (d) a variation of the amplitude of the difference frequency component; and calculating a variation of a Young modulus of the sample, wherein calculating the variation of the Young modulus comprises the steps of calculating a variation of a sample contact stiffness constant using the variation of the phase of the difference frequency component, and calculating the variation of the Young modulus using the calculated variation of the sample contact stiffness constant.

10. The method of claim 9, wherein the variation of the sample contact stiffness constant $\Delta k_s$ is calculated using equation $$\Delta\Omega_{tot} = (\Delta\beta_{cs} + \Delta\alpha_{cc} + \Delta\phi_{ss} - \Delta\phi_{cc} - \Delta\phi_{cs}),$$

where $$\Delta\beta_{cs} = -\left(\frac{\gamma_s \Delta\omega}{[k_s + F'(z_0)]^2 + \gamma_s^2(\Delta\omega)^2}\right)\Delta k_s;$$

$$\Delta\alpha_{cc} = \frac{\gamma_s \omega_c}{[k_s + F'(z_0)]^2 + \gamma_s^2 \omega_c^2}\Delta k_s;$$

$$\Delta\phi_{ss} = -\frac{A_{ss}}{B_{ss}}\Delta k_s; \Delta\phi_{cc} = -\frac{A_{cc}}{B_{cc}}\Delta k_s; \Delta\phi_{cs} = -\frac{A_{cs}}{B_{cs}}\Delta k_s;$$

$$A_{cc} = [\gamma_s k_{cq}^2 + 2F'(z_0)\gamma_s k_{cq} + F'(z_0)^2(\gamma_c + \gamma_s)]$$
$$\omega_c + [\gamma_c^2 \gamma_s - 2\gamma_s m_c(k_{cq} + F'(z_0))]\omega_c^3 + m_c^2 \gamma_s \omega_c^5;$$

$$B_{cc} = \{[\gamma_c k_s + \gamma_s k_{cq} + F'(z_0)(\gamma_c + \gamma_s)]\omega_c - \gamma_s m_c \omega_c^3\}^2 +$$
$$\{[k_{cq} - m_c\omega_c^2 + F'(z_0)]k_s + F'(z_0)(k_{cq} - m_c\omega_c^2) - \gamma_c\gamma_s\omega_c^2\};$$

$$A_{ss} = [\gamma_s k_{cr}^2 + 2F'(z_0)\gamma_s k_{cr} + F'(z_0)^2(\gamma_c + \gamma_s)]\omega_s + [\gamma_c^2\gamma_s -$$
$$2\gamma_s m_c(k_{cr} + F'(z_0))]\omega_s^3 + m_c^2 \gamma_s \omega_s^5;$$

$$B_{ss} = \{[\gamma_c k_s + \gamma_s k_{cr} + F'(z_0)(\gamma_c + \gamma_s)]\omega_s - \gamma_s m_c \omega_s^3\}^2 +$$
$$\{[k_{cr} - m_c\omega_s^2 + F'(z_0)]k_s + F'(z_0)(k_{cr} - m_c\omega_s^2) - \gamma_c\gamma_s\omega_s^2\};$$

$$A_{cs} = [\gamma_s k_{cp}^2 + 2F'(z_0)\gamma_s k_{cp} + F'(z_0)^2(\gamma_c + \gamma_s)](\Delta\omega) + [\gamma_c^2\gamma_s -$$
$$2\gamma_s m_c(k_{cp} + F'(z_0))](\Delta\omega)^3 + m_c^2 \gamma_s(\Delta\omega);$$

is a damping coefficient of the sample; $\Delta\omega=(\omega_c-\omega_s)$, $\omega_c$ is the first frequency, $\omega_s$ is the second frequency, $F'(z_0)$ is an effective stiffness constant of a nonlinear interaction force at a quiescent cantilever tip-sample surface separation distance $z_0$; $k_{cp}$ is a cantilever stiffness constant corresponding to a $p^{th}$ linear or nonlinear non-contact resonance mode of the cantilever having a frequency nearest $\Delta\omega$; $\gamma_c$ is a cantilever damping coefficient; in $m_c$ is an effective mass of the cantilever; $k_{cq}$ is a cantilever stiffness constant corresponding to a $q^{th}$ non-contact resonance mode of the cantilever having a frequency nearest $\omega_c$; and $k_{cr}$ is a cantilever stiffness constant corresponding to an $r^{th}$ non-contact resonance mode of the cantilever having a frequency nearest $\omega_s$;

wherein the variation in the Young modulus $\Delta E$ from the sample surface is calculated using equations $$\Delta\Omega_{tot}=(\Delta\beta_{cs}+\Delta\alpha_{cc}+\Delta\phi_{ss}-\Delta\phi_{cc}-\Delta\phi_{cs}), \text{ and}$$

$$\Delta k_s=(1-v^2)(6E^{*-1}RF)^{1/3}(E^*/E)^2\Delta E, \text{ where}$$

k is a wave number of the frequency generator signal; c is a sound velocity of the matrix material; $c_d$ is a sound velocity of a subsurface feature; E is a Young modulus of the matrix material;

$$E^* = \left(\frac{1-v^2}{E} + \frac{1-v_T^2}{E_T}\right)^{-1}$$

is a reduced Young modulus where $\nu$ is a Poisson ratio of the matrix material, $\nu_T$ is a Poisson ratio of the cantilever tip, and $E_T$ is a Young modulus of the cantilever tip; and equating $\Delta\Omega_{tot}$ to a measured variation of the phase of the difference-frequency component; and wherein the variation in the Young modulus $\Delta E$ from a sample subsurface feature is calculated using the equation $$\Delta\chi = -\frac{kdc}{2c_d E}\left[\frac{1}{2} + \frac{e^{\alpha a}\cos ka - 1}{(e^{\alpha a} - \cos ka)^2 + \sin^2 ka}\right]\Delta E$$

and equating $\Delta\chi$ to a measured variation of the phase of the difference-frequency component; and wherein the variation in the Young modulus is further calculated by summing $\Delta\Omega_{tot}$ and $\Delta\chi$ if the sample surface and subsurface variations in the Young modulus are substantially the same and equating the sum to a measured variation of the phase of the difference-frequency component.

* * * * *